(12) United States Patent
Hori et al.

(10) Patent No.: US 11,398,234 B2
(45) Date of Patent: Jul. 26, 2022

(54) UTTERANCE SUPPORT APPARATUS, UTTERANCE SUPPORT METHOD, AND RECORDING MEDIUM

(71) Applicant: Hitachi, Ltd., Tokyo (JP)

(72) Inventors: Satomi Hori, Tokyo (JP); Yuudai Kamada, Tokyo (JP); Eriko Uegaki, Tokyo (JP); Ryota Niizeki, Tokyo (JP); Hideyuki Maki, Tokyo (JP); Daisuke Nogami, Tokyo (JP); Shigeto Ooeda, Hitachi (JP); Yasuhiro Wakita, Hitachi (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/071,027

(22) Filed: Oct. 15, 2020

(65) Prior Publication Data
US 2021/0280183 A1   Sep. 9, 2021

(30) Foreign Application Priority Data

Mar. 6, 2020 (JP) .............................. JP2020-038979

(51) Int. Cl.
*G10L 15/22* (2006.01)
*G06T 3/40* (2006.01)
(Continued)

(52) U.S. Cl.
CPC ................. *G10L 15/22* (2013.01); *G06T 3/40* (2013.01); *G06T 11/001* (2013.01); *G06T 11/206* (2013.01); *G10L 15/02* (2013.01)

(58) Field of Classification Search
CPC ......... G10L 15/22; G10L 15/02; G10L 21/10; G06T 3/40; G06T 11/001; G06T 11/206;
(Continued)

(56) References Cited

U.S. PATENT DOCUMENTS 8,856,006 B1 * 10/2014 Patel ....................... G10L 15/22
704/255
2007/0106724 A1   5/2007 Gorti et al.
(Continued)

FOREIGN PATENT DOCUMENTS

JP        2008-262046 A    10/2008

OTHER PUBLICATIONS

Extended European Search Report received in corresponding European Application No. 20202680.3 dated Apr. 12, 2021.
(Continued)

*Primary Examiner* — Michael Le
(74) *Attorney, Agent, or Firm* — Mattingly & Malur, PC

(57) ABSTRACT

An utterance support apparatus includes: a processor configured to execute a program; and a storage device configured to store the program, wherein the processor is configured to execute: calculation processing of calculating an accumulated value of utterance periods of each of a plurality of speakers, and clearing the accumulated value of a speaker having the accumulated value that has reached a predetermined value; and display processing of displaying a first graphic in a display region, which is included in a group of display regions each assigned to each of the plurality of speakers, and which is assigned to the speaker having the accumulated value that has reached the predetermined value.

13 Claims, 11 Drawing Sheets

(51) Int. Cl.
*G06T 11/00* (2006.01)
*G06T 11/20* (2006.01)
*G10L 15/02* (2006.01)

(58) Field of Classification Search
CPC .. G06Q 10/06398; G06Q 10/10; G06F 9/451; G06F 16/3346; G06F 16/34; H04N 7/15
See application file for complete search history.

(56) References Cited

U.S. PATENT DOCUMENTS

| | | | |
|---|---|---|---|
| 2008/0255847 A1* | 10/2008 | Moriwaki | G10L 21/06 704/270.1 |
| 2016/0247520 A1* | 8/2016 | Kikugawa | G10L 21/10 |
| 2017/0061987 A1* | 3/2017 | Kikugawa | G10L 25/54 |
| 2017/0078616 A1* | 3/2017 | Uchiyama | G10L 25/57 |
| 2018/0191912 A1* | 7/2018 | Cartwright | G10L 15/22 |
| 2020/0175961 A1* | 6/2020 | Thomson | G10L 15/22 |

OTHER PUBLICATIONS

Dimicco, J. M. et al., "Influencing Group Participation with a Shared Display", Computer Supported Cooperative Work Conference Proceedings, Nov. 6, 2004, pp. 614-623.

* cited by examiner

| TIME | SPEAKER ID : 1 | SPEAKER ID : 2 | SPEAKER ID : 3 | SPEAKER ID : 4 | SPEAKER ID : 5 |
|---|---|---|---|---|---|
| t1 | 0 | 0 | 0 | 0 | 0 |
| t2 | 0 | 0 | 0 | 0 | 0 |
| t3 | 0 | 0 | 1 | 0 | 0 |
| t4 | 1 | 0 | 1 | 0 | 0 |
| t5 | 1 | 1 | 0 | 0 | 0 |
| t6 | 1 | 1 | 0 | 0 | 0 |
| t7 | 0 | 1 | 0 | 0 | 0 |
| t8 | 0 | 1 | 0 | 0 | 1 |
| t9 | 0 | 1 | 0 | 0 | ... |
| ... | ... | ... | ... | ... | ... |
| ACCUMULATED VALUE | 3 | 5 | 2 | 0 | 1 |

*FIG.6*

UTTERANCE SUPPORT APPARATUS, UTTERANCE SUPPORT METHOD, AND RECORDING MEDIUM

CLAIM OF PRIORITY

The present application claims priority from Japanese patent application JP 2020-38979 filed on Mar. 6, 2020, the content of which is hereby incorporated by reference into this application.

BACKGROUND

This invention relates to an utterance support apparatus, an utterance support method, and an utterance support program, which are configured to support utterance.

In JP 2008-262046 A, there is disclosed a meeting visualization system, which is configured to acquire voices of a plurality of participants in a meeting, and display an ever-changing conversation state of the participants in real time, to thereby induce more positive discussion. In the meeting visualization system, voice data collected from a plurality of voice collecting units corresponding to the plurality of participants of the meeting is processed by a voice processing server so as to extract utterance information. The utterance information is sequentially input to an aggregation server. A stream data processing unit of the processing server is configured to apply query processing to the utterance information, to thereby generate activity data, for example, an accumulated value of the number of times of utterance of the participants of the meeting in the meeting. A display processing unit is configured to visualize and display dialogue situations of the participants of the meeting based on the activity data through use of the sizes of circles, the thicknesses of lines, or the like.

An utterance activity contributing to an increase in productivity of a meeting is required for active discussion in the meeting. Regarding the productivity, when a state in which all of speakers are uttering much is defined as a state high in productivity, a state in which only a part of the speakers are uttering much, a state in which all of the speakers are uttering a little, and a state in which a part of the speakers are uttering a little can be considered as states not high in productivity.

SUMMARY

This invention has an object to induce a state high in productivity of a meeting held by speakers from a state not high in productivity.

An aspect of the invention disclosed in this application is an utterance support apparatus, comprising: a processor configured to execute a program; and a storage device configured to store the program, wherein the processor is configured to execute: calculation processing of calculating an accumulated value of utterance periods of each of a plurality of speakers, and clearing the accumulated value of a speaker having the accumulated value that has reached a predetermined value; and display processing of displaying a first graphic in a display region, which is included in a group of display regions each assigned to each of the plurality of speakers, and which is assigned to the speaker having the accumulated value that has reached the predetermined value.

According to at least one representative embodiment of this invention, it is possible to induce the state high in productivity of the meeting held by speakers from the state not high in productivity. Other objects, configurations, and effects than those described above are clarified by the following description of an embodiment.

BRIEF DESCRIPTION OF THE DRAWINGS

FIG. 6 is an explanatory table for showing an example of an utterance period table corresponding to the time-series data on the presence or absence of utterance of FIG. 5.

DETAILED DESCRIPTION OF THE EMBODIMENT

Productivity of Meeting

It is considered that productivity of a meeting and an amount of discussion in the meeting have a positive correlation. In other words, the productivity of the meeting increases as an amount of utterance of all of speakers increases. As causes of obstructing the productivity of the meeting, there are known a person who utters too much one-sidedly and a person who utters a little or does not utter. The person who utters too much one-sidedly does not notice that the person is uttering too much, or continues uttering because the person is afraid of silence. The person who utters a little or does not utter thinks that the discussion has nothing to do with the person, or thinks that the discussion has something to do with the person, but intentionally behaves so as not to be noticeable. A reason for behaving so as not to be noticeable is that the person dislikes arising of a task to be assigned to the person, or the person assumes by oneself that the person is not responsible for participating in the discussion in the first place.

Figure 1:
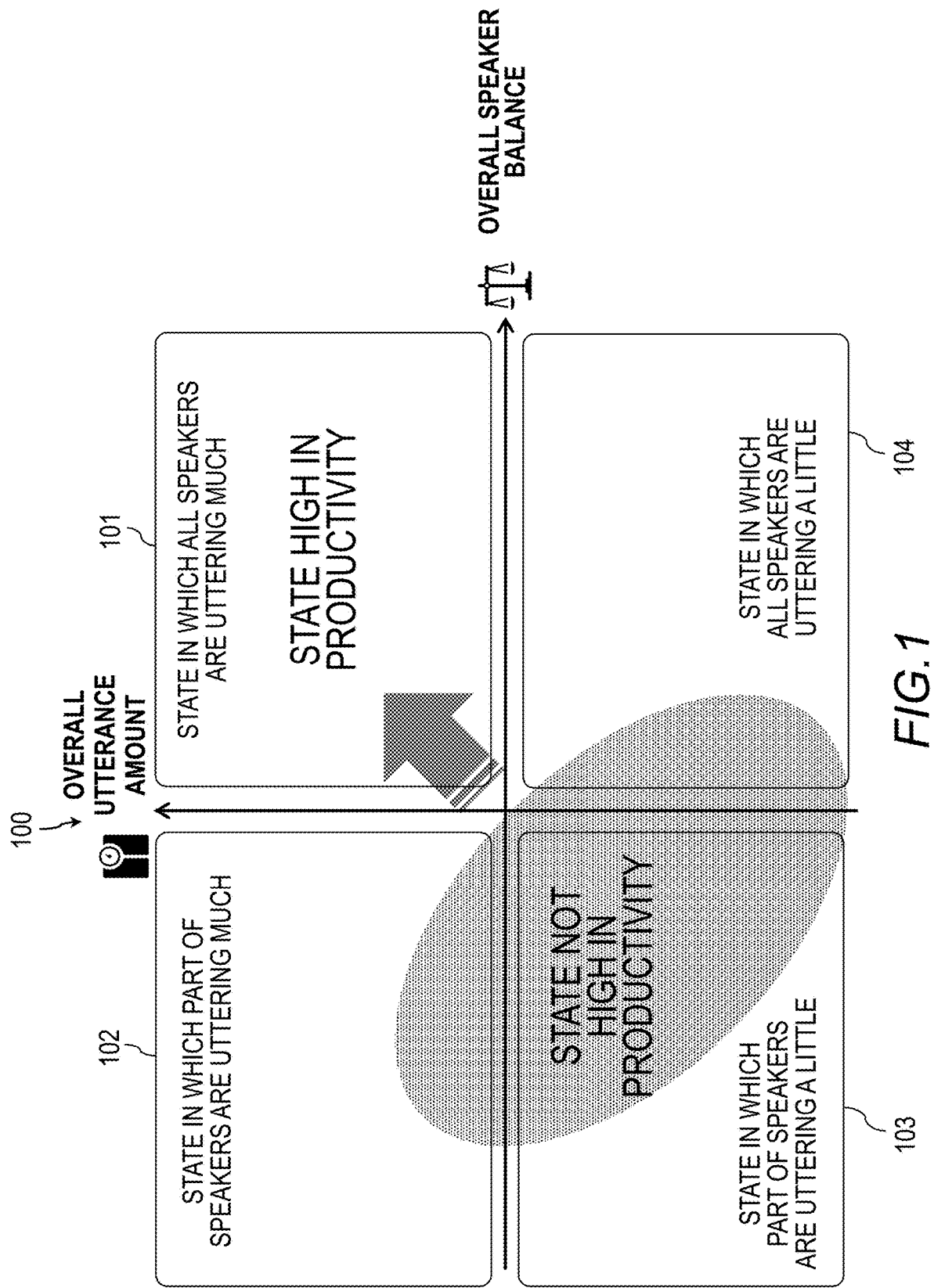
FIG. 1 is a state discrimination graph for discriminating a state of a meeting.

FIG. 1 is a state discrimination graph for discriminating a state of a meeting. The horizontal axis of a state discrimination graph 100 represents an overall speaker balance, and the vertical axis thereof represents an overall utterance level. The horizontal axis indicates that the overall speaker balance becomes better as the position moves rightward, and the overall speaker balance becomes worse as the position moves leftward. The overall speaker balance is a degree of balance among the amounts of utterance of the respective speakers. The overall speaker balance becomes better as the amounts of utterance of the respective speakers become more balanced, and the overall speaker balance becomes worse as the amounts of utterance of the respective speakers become less balanced. The vertical axis indicates that the overall utterance level increases as the position moves upward. The overall utterance level is a length of a period of time in which at least one of a plurality of speakers utters, or a ratio of this length of period of time of utterance to an elapsed period of time of a meeting.

A first quadrant 101 corresponds to a state in which the overall speaker balance is satisfactory, and the overall utterance level is high, that is, a state in which all of the speakers are uttering much. This state is a state high in productivity. A second quadrant 102 corresponds to a state in which the overall speaker balance is unsatisfactory, but the overall utterance level is high, that is, a part of the speakers are uttering much. A third quadrant 103 corresponds to a state in which the overall speaker balance is unsatisfactory, and the overall utterance level is also low, that is, a part of the speakers are uttering a little. A fourth quadrant 104 corresponds to a state in which the overall speaker balance is satisfactory, but the overall utterance level is low, that is, all of the speakers are uttering a little.

The states of the second quadrant 102, the third quadrant 103, and the fourth quadrant 104 correspond to states not high in productivity, and an utterance support apparatus of at least one embodiment of this invention executes utterance support for bringing the state not high in productivity to the state high in productivity of the first quadrant 101. As a result, it is expected that a speaker having a smaller utterance amount utters more, and a speaker having a larger utterance amount suppresses the utterance.

Meeting

Figure 2:
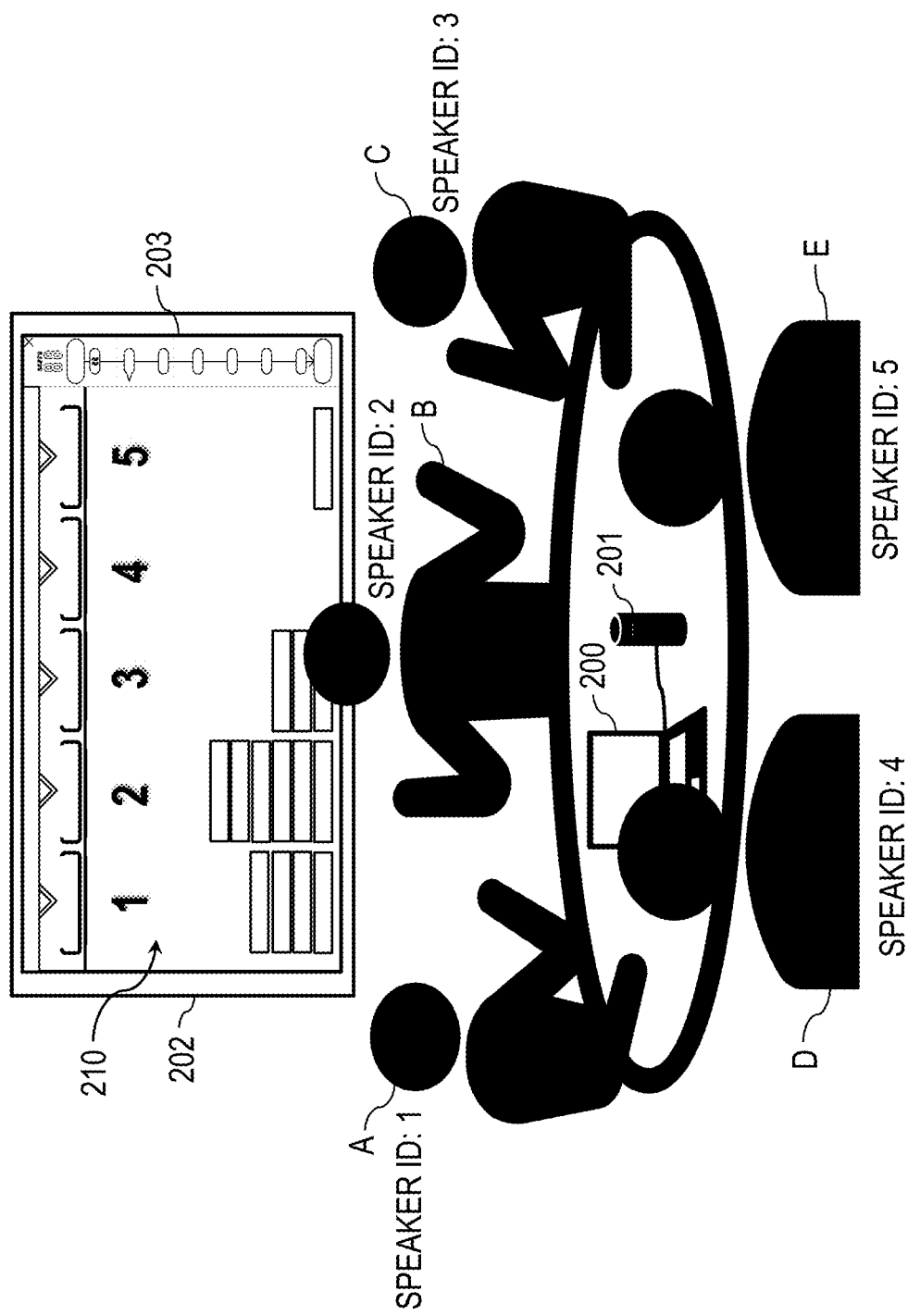
FIG. 2 is an explanatory diagram for illustrating an example of a meeting in which the utterance support apparatus is used.

FIG. 2 is an explanatory diagram for illustrating an example of a meeting in which the utterance support apparatus is used. In FIG. 2, there is illustrated an example in which five speakers A to E participate in the meeting for discussion. Moreover, in the meeting, an utterance support apparatus 200, a voice collection apparatus 201, and a display apparatus 202 are used. The utterance support apparatus 200 is a computer on which an utterance support program is installed. The voice collection apparatus 201 is configured to collect uttered voices from the speakers A to E, convert the collected voices to electrical signals, and transmit the electrical signals to the utterance support apparatus 200. The voice collection apparatus 201 may be built into the utterance support apparatus 200. The display apparatus 202 includes a display screen 203, and is configured to display utterance support information 210 received from the utterance support apparatus 200 on the display screen 203. Moreover, in place of the display apparatus 202, a projector may be used, and the projector may project utterance support results onto a wall. Speaker IDs of the respective speakers A to E are 1 to 5. In the following, in at least one embodiment, description is given of a case in which the five speakers hold a meeting.

Hardware Configuration

Figure 3:
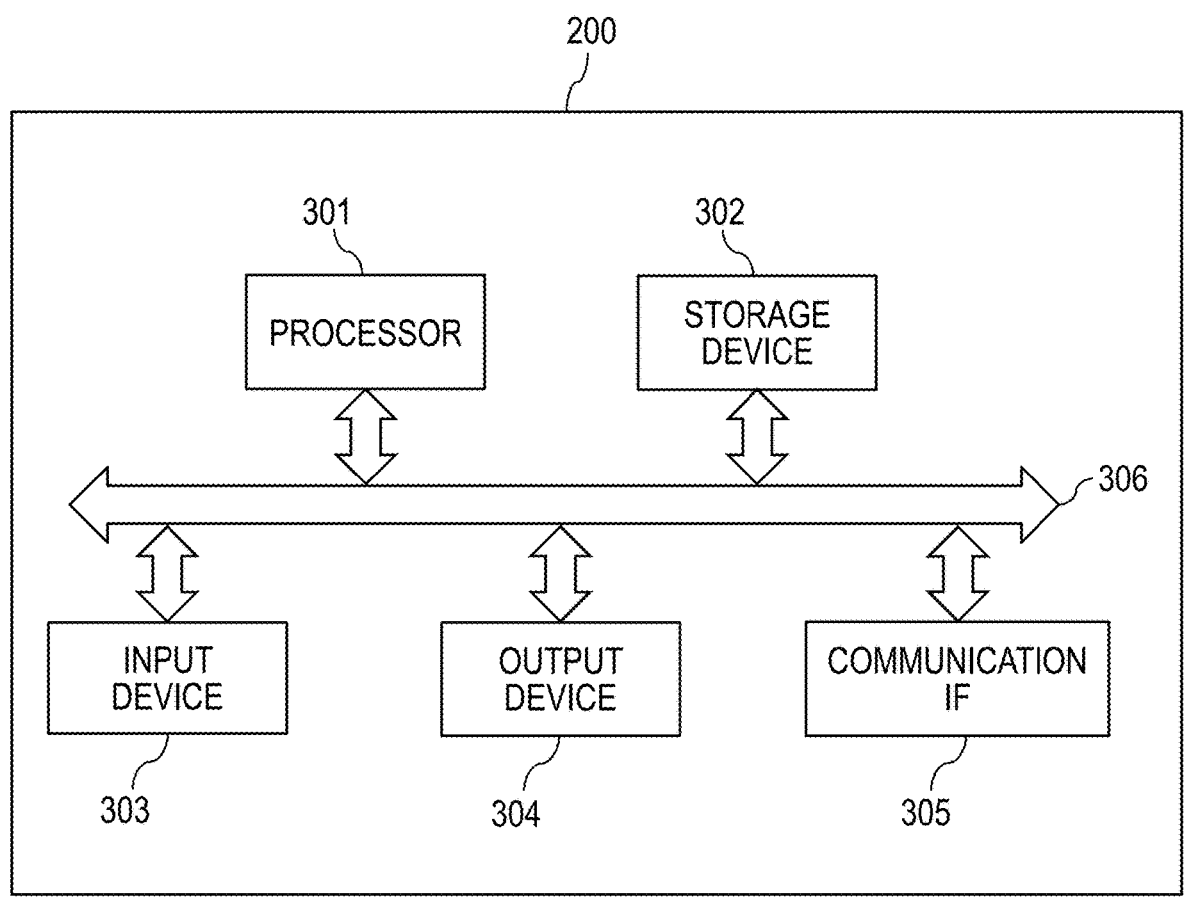
FIG. 3 is a block diagram illustrating a hardware configuration example of the utterance support apparatus.

FIG. 3 is a block diagram illustrating a hardware configuration example of the utterance support apparatus 200. The utterance support apparatus 200 includes a processor 301, a storage device 302, an input device 303, an output device 304, and a communication interface (communication IF) 305. The processor 301, the storage device 302, the input device 303, the output device 304, and the communication IF 305 are connected to one another by a bus 306. The processor 301 controls the utterance support apparatus. The processor 301 executes various programs. The storage device 302 serves as a work area of the processor 301. The storage device 302 is a non-transitory or temporary recording medium which stores the various programs and data. The storage device 302 can be, for example, a read-only memory (ROM), a random access memory (RAM), a hard disk drive (HDD), or a flash memory. The input device 303 inputs data. The input device 303 can be, for example, a keyboard, a mouse, a touch panel, a ten-key pad, or a scanner. The output device 304 outputs data. The output device 304 can be, for example, a display, a printer or a speaker. The communication IF 305 couples to a network to transmit and receive data.

Display Example of Utterance Support Information 210

Figure 4:
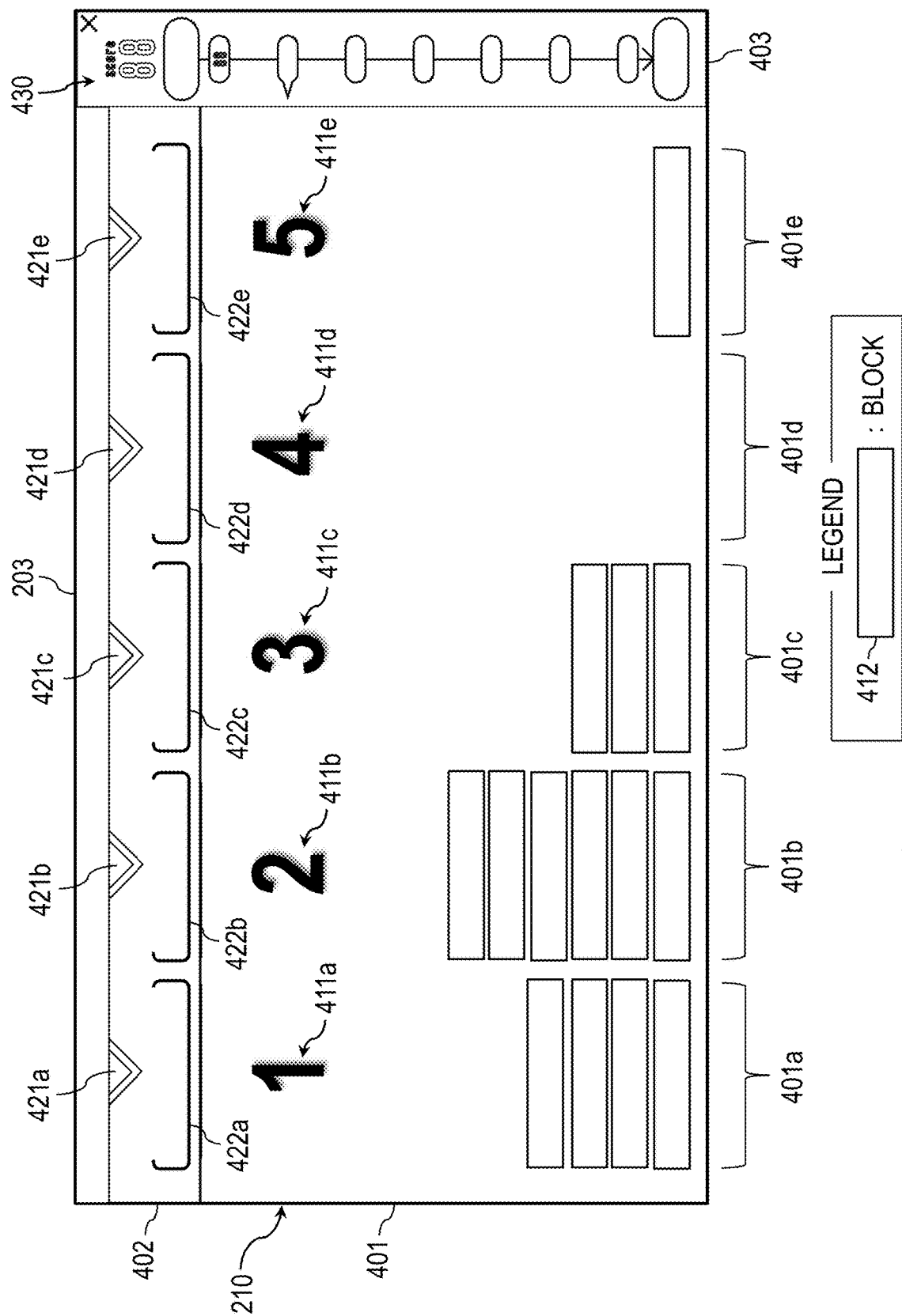
FIG. 4 is an explanatory diagram for illustrating a display example of the utterance support information.

FIG. 4 is an explanatory diagram for illustrating a display example of the utterance support information 210. The utterance support information 210 is displayed on the display screen 203. The utterance support information 210 includes a first display region 401, a second display region 402, and a third display region 403. The first display region 401 is a region for displaying blocks 412 indicating the utterance amount of each of the speakers A to E. The respective first display regions for the speakers A to E are denoted by first display regions 401a to 401e. The first display regions 401a to 401e are arranged in a widthwise direction of the display screen 203. When the speakers A to E are not distinguished from one another, the first display region is generally referred to as "first display region 401x."

The block 412 is a graphic indicating an utterance amount of utterance of each of the speakers A to E for a predetermined accumulated period of time. In this example, the shape of the block 412 is a rectangle, but may be another shape such as a circle, an ellipsoid, a trapezoid, a triangle, or a polygon having five or more vertices. The block 412 is piled up in each of the first display regions 401a to 401e each time each of the speakers A to E utters for the predetermined accumulated period of time. In FIG. 4, the speaker A has four blocks 412, the speaker has six blocks 412, the speaker C has three blocks 412, the speaker D has zero blocks 412, and the speaker E has one block 412.

As described above, it is found that the speaker having blocks 412 piled higher has a larger utterance amount. Moreover, it is found that the overall speaker balance becomes better as the number of blocks 412 becomes better balanced among the speakers A to E.

Moreover, speaker IDs 411a to 411e of the respective speakers A to E are displayed in the first display regions 401a to 401e. As a result, it is possible to visually recognize which of the speakers A to E are assigned to which of the first display regions 401a to 401e.

The second display region 402 exists above the first display region 401. The second display region 402 includes discharge ports 421a to 421e and containers 422a to 422e as images for the first display regions 401a to 401e, respectively. When the discharge ports 421a to 421e are not distinguished from one another, the discharge port is generally referred to as "discharge port 421." When the containers 422a to 422e are not distinguished from one another, the container is generally referred to as "container 422."

The discharge port 421 is configured to discharge droplets to the container 422. The container 422 is configured to store the droplets. The stored liquid represents the utterance amount. When the stored utterance amount reaches a predetermined amount, the liquid stored in the container 422 falls as the block 412 from an upper portion of the first display region 401 to a lower portion thereof, and the container 422 is thus emptied.

The third display region 403 is arranged, for example, at a right end of the utterance support information 210. The third display region 403 is configured to display a score 430. The score 430 is a value based on the number of times of deletion of a block row at the lowest positions of the first display regions 401a to 401e. A higher score 430 corresponds to a state in which the speaker balance is better, and the utterance amount is larger, that is, a state in which the productivity of a meeting is the productivity of the state of the first quadrant 101 or a state transitioning from the state of any one of the second quadrant 102 to the fourth quadrant 104 to the state of the first quadrant 101.

Example of Acquisition of Voices

Figure 5:
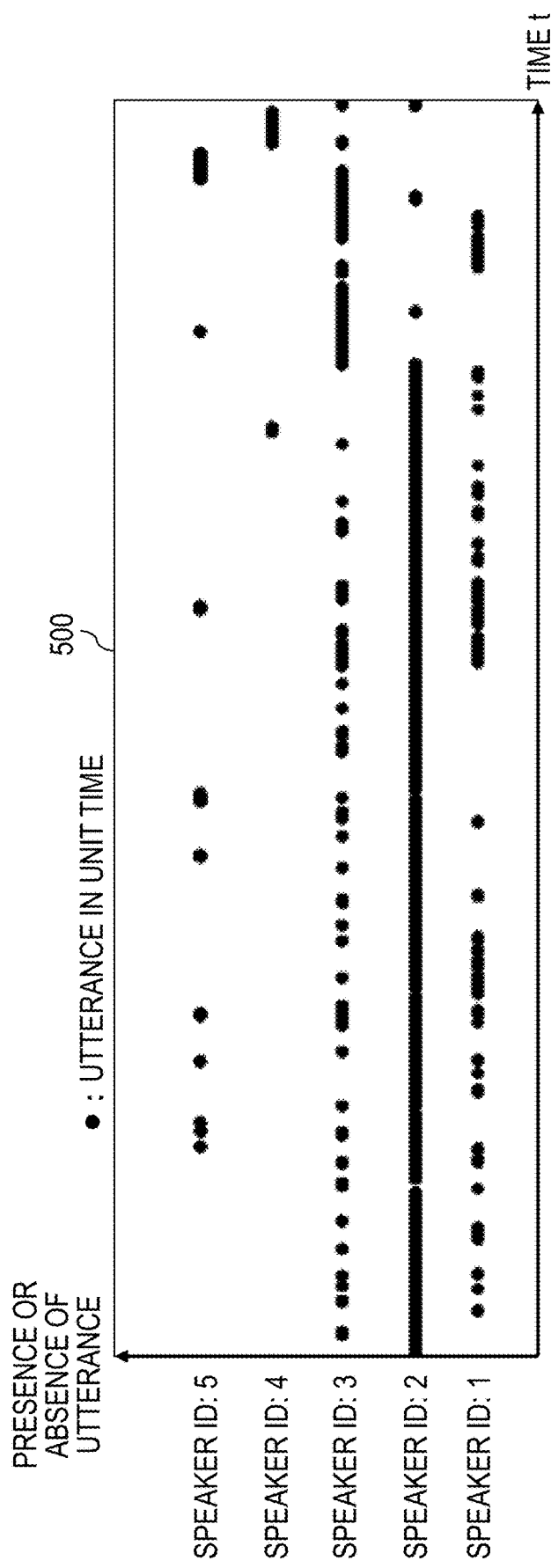
FIG. 5 is an explanatory diagram for illustrating an example of time-series data on presence or absence of utterance.

FIG. 5 is an explanatory diagram for illustrating an example of time-series data on presence or absence of utterance. Time-series data 500 on the presence or absence of utterance is data rows each formed by plotting the presence or absence of utterance in a unit time (for example, one second) for each of the speaker IDs 411a to 411e.

FIG. 6 is an explanatory table for showing an example of an utterance period table corresponding to the time-series data on the presence or absence of utterance of FIG. 5. In the utterance period table 600, times t1, t2, t3, . . . are a time series of unit time. For each of the speaker IDs 411a to 411e, "0" represents the absence of the utterance, and "1" represents the presence of the utterance. For example, in the unit time at the time t3, it is shown that only the speaker C corresponding to the speaker ID: 3 utters, and the other speakers A, B, D, and E do not utter.

The utterance support apparatus 200 can recognize when and which speaker utters. Specifically, for example, the utterance support apparatus 200 is configured to acquire voice data on the respective speakers A to E in advance, and generate characteristic information on each of the speakers A to E based on parameters such as a mel frequency cepstral coefficient, an angle of arrival, and a volume of the voice. When the utterance support apparatus 200 acquires the voice data in the meeting, the utterance support apparatus 200 generates characteristic information, and when the characteristic information is similar to characteristic information generated in advance, identifies a speaker corresponding to the similar characteristic information.

Moreover, the utterance support apparatus 200 is configured to use a training data set, which is a combination of the above-mentioned parameter and correct data (speaker), to thereby generate a learning model through use of machine learning. When the utterance support apparatus 200 acquires the voice data in a meeting, the utterance support apparatus 200 inputs the acquired voice data to the leaning model, to thereby identify whose utterance the voice data corresponds to.

Moreover, when the voice collection apparatus 201 is a microphone array, the utterance support apparatus 200 may detect a direction of the voice input to the voice collection apparatus 201, to thereby identify a speaker. In this case, it is assumed that the utterance support apparatus 200 associates, in advance, positions of the speakers and the speaker IDs 411a to 411e with each other, and the respective speakers know the own speaker IDs 411a to 411e.

Moreover, when details of the conversation are recorded, the speaker is not comfortable with the utterance, and the utterance support apparatus 200 is thus configured not to recognize the details of the utterance. Therefore, the recorded voice data is deleted in real time (however, the utterance time table 600 is maintained). As a result, leak of the voice data is suppressed. Consequently, it is possible to prevent information from leaking. Moreover, the utterance support apparatus 200 does not recognize the details of the utterance, and thus does not generate the block 214 based on the details of the conversation. Thus, the utterance support apparatus 200 is applicable to any languages such as foreign languages including English, French, Germany, and Chinese in addition to Japanese, and is thus highly versatile.

Example of Generation of Block

Figure 7:
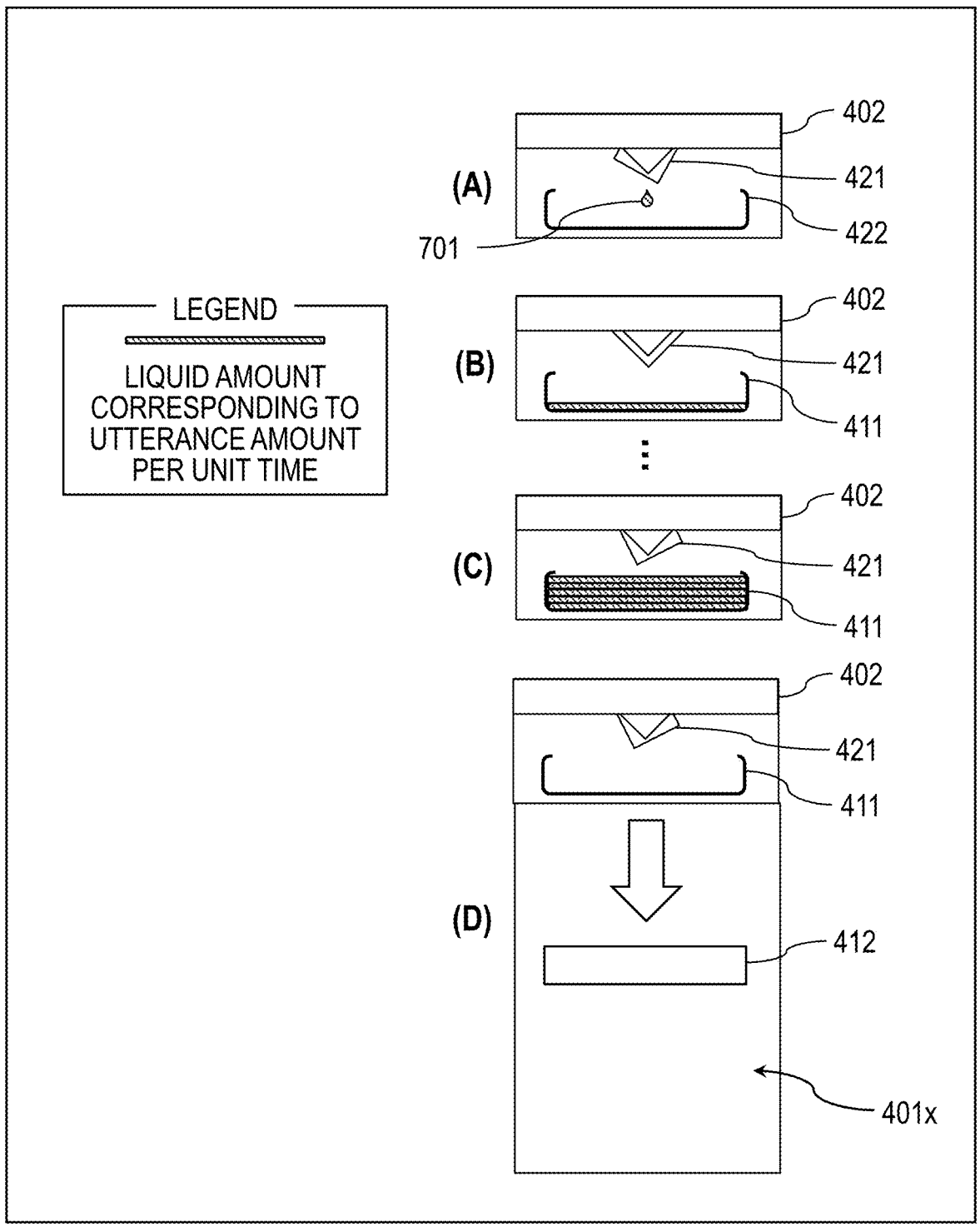
FIG. 7 is an explanatory diagram for illustrating an example of the generation of the block in the first display region.

FIG. 7 is an explanatory diagram for illustrating an example of the generation of the block in the first display region. In FIG. 7, description is given of states in a chronological order from a state (A) to a state (D). The state (A) is a state in which a droplet 701 is discharged from the discharge port to the container 422. When animation of the state (A) is drawn, this state indicates that the utterance support apparatus 200 recognizes an utterance of a corresponding speaker. As long as the speaker continues the utterance, the droplets 701 continue to fall down from the discharge port 421.

The state (B) indicates a state in which the utterance stops, and a certain amount of the liquid is stored. The state (B) indicates that an utterance corresponding to the unit time has been made once. In other words, when the value in the table of FIG. 6 becomes "1", the utterance support apparatus 200 discharges an amount of the liquid corresponding to one unit time from the discharge port 421. As a result of repetitions of the states (A) and (B), the liquid is accumulated in the container 422 in the state (C).

The accumulated amount of the liquid corresponds to an accumulated utterance period of the speaker. For example, in the utterance period table 600 of FIG. 6, the speaker B corresponding to the speaker ID: 2 is uttering from the time t5 to the time t9, and the accumulated utterance amount of the speaker B from the time t1 to the time t9 is "5." Therefore, in the state (C), the liquid amount corresponding to the five unit times is stored in the container 422.

Moreover, when a certain amount of the liquid is stored, the container 422 becomes full. It is assumed that a predetermined value of the utterance amount indicating the full state is, for example, "5." The state (C) indicates that the liquid amount corresponding to the five unit times is stored, and the container 422 is thus full.

In the state (D), the container 422 is full, and the liquid stored in the container 422 falls down as the block 412 to the first display region. When blocks 412 do not exist in the first display region 401, the block 412 is arranged at the lowest position. When blocks 412 exist in the first display region 401, the fallen block 412 is piled on the highest block 412. In this example, the block 412 indicates the utterance amount of the five unit times (five seconds).

Example of Procedure of Block Display Processing

Figure 8:
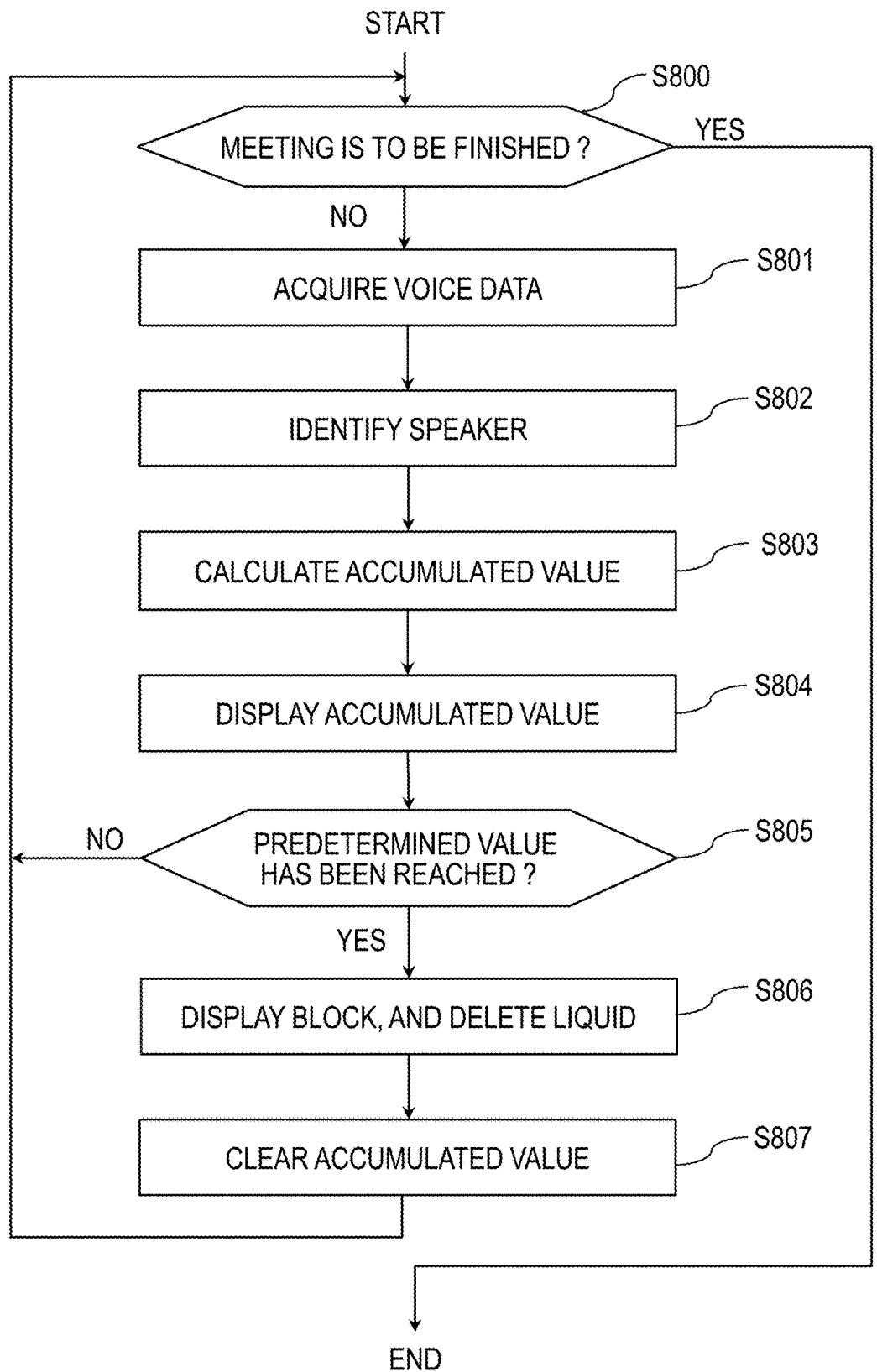
FIG. 8 is a flowchart for illustrating an example of a procedure of block display processing by the utterance support apparatus.

FIG. 8 is a flowchart for illustrating an example of a procedure of block display processing by the utterance support apparatus 200. The utterance support apparatus 200 determines whether or not a meeting is to be finished based on, for example, a predetermined elapsed period of time from a start of the meeting (Step S800). When the meeting is not to be finished (No in Step S800), the utterance support apparatus 200 acquires the voice data from the voice collection apparatus 201 (Step S801), and identifies speakers (Step S802). As a result, the utterance support apparatus 200 updates the utterance time table 600 shown in FIG. 6 in accordance with the time-series data 500 on the utterances illustrated in FIG. 5 after the identification of the speakers. Processing from Step S803 is executed for each of the identified speakers.

After that, the utterance support apparatus 200 refers to the utterance period table 600, to thereby calculate the accumulated value of the utterance periods of the speaker identified in Step S802 (Step S803). The accumulated value of the utterance periods is a sum of the values of the elapsed periods in the utterance period table 600. When it is assumed that the current time is the time t9, the accumulated value of the utterance periods of the speaker A corresponding to the speaker ID: 1 is "3." The accumulated value of the utterance periods of the speaker B corresponding to the speaker ID: 2 is "5." The accumulated value of the utterance periods of the speaker C corresponding to the speaker ID: 3 is "2." The accumulated value of the utterance periods of the speaker D corresponding to the speaker ID: 4 is "0." The accumulated value of the utterance periods of the speaker E corresponding to the speaker ID: 5 is "1."

The utterance support apparatus 200 uses the animation of the discharge of the droplets 701 from the discharge port 421, to thereby display the accumulated value calculated in Step S803 as the amount of the liquid stored in the container 422 (Step S804). After that, the utterance support apparatus 200 determines whether or not the accumulated value of the utterance periods has reached the predetermined value (5 in this example) (Step S805). When the accumulated value has not reached the predetermined value (No in Step S805), the utterance support apparatus 200 returns to Step S800.

Meanwhile, the accumulated value has reached the predetermined value (Yes in Step S805), the utterance support apparats 200 converts the liquid full in the container 422 to the block 412, displays the block 412 in the first display region 401, and deletes the liquid in the container 422 (Step S806). After that, the utterance support apparatus 200 clears the accumulated value of the utterance period table 600 (Step S807), and returns to Step S800. Specifically, for example, when the current time is t9, the accumulated value of the utterance periods of the speaker B corresponding to the speaker ID: 2 has reached "5," that is, the predetermined value (Yes in Step S805), and the utterance support apparatus 200 thus sets all the values up to the time t9 in a column corresponding to the speaker ID: 2 to "0."

In Step S800, when the meeting is to be finished (Yes in Step S800), the block display processing procedure is finished.

Deletion of Block Row

Figure 9:
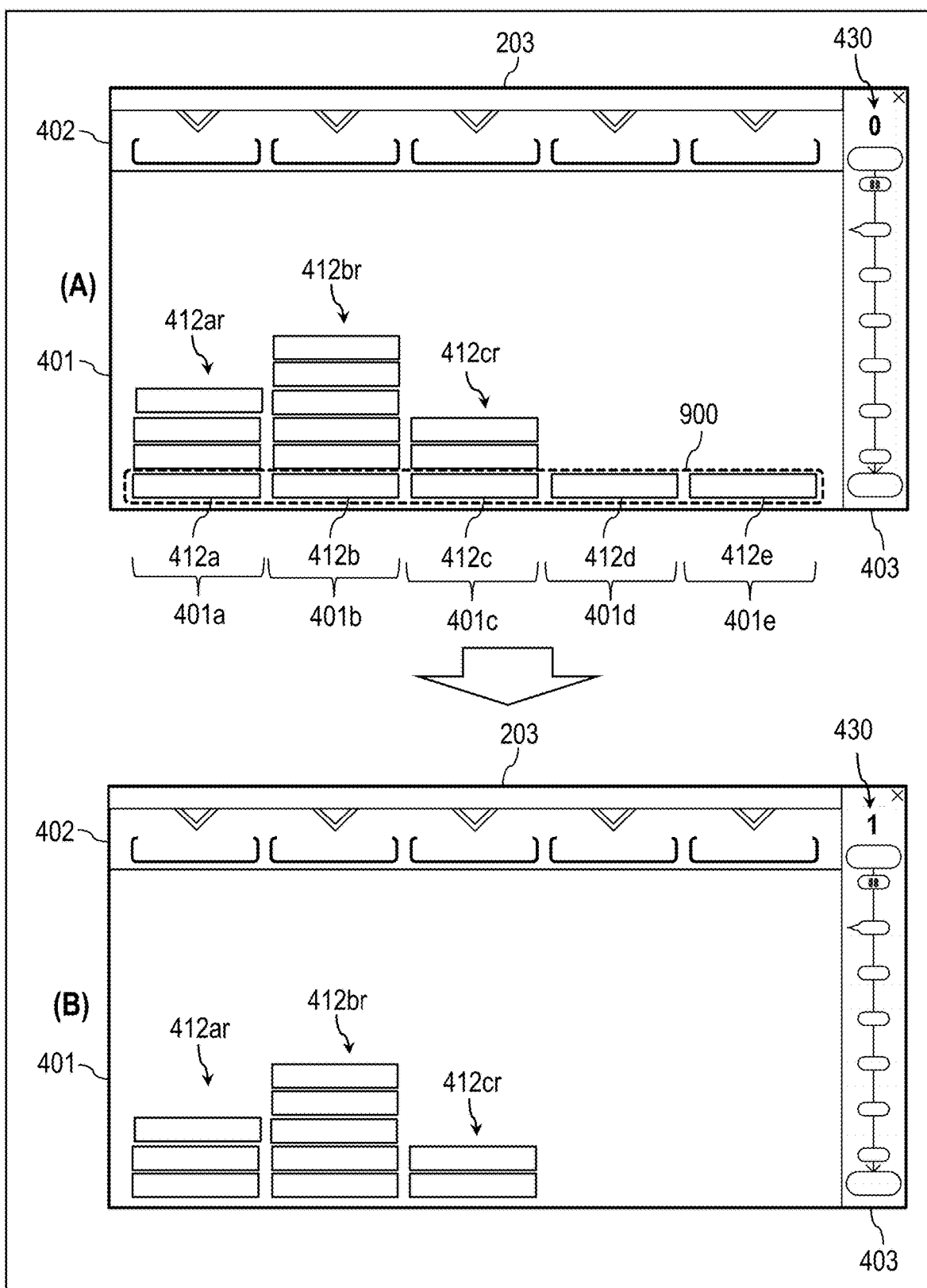
FIG. 9 is an explanatory diagram for illustrating an example of the deletion of the block row.

FIG. 9 is an explanatory diagram for illustrating an example of the deletion of the block row. A state (A) is a display state of the display screen 203 before the deletion of the block row, and it is assumed that the score is "0." A state (B) is a display state of the display screen 203 after the deletion of the block row, and the score is thus "1."

In the state (A), when the speaker D corresponding to the speaker ID: 4 utters for five seconds from the state of FIG. 4, a block 412d is generated and displayed in the first display region 401d. A block group 412ar is a group of blocks piled on a block 412a at the lowest position in the first display region 401a. A block group 412br is a group of blocks piled on a block 412b at the lowest position in the first display region 401b. A block group 412cr is a group of blocks piled on a block 412c at the lowest position in the first display region 401c.

In the state (A), there exists a block row 900 formed of the blocks 412a to 412e at the lowest positions of the respective first display regions 401a to 401e. In the state (B), when the block row 900 is thus displayed in the first display region 401, the utterance support apparatus 200 deletes the block row 900. Moreover, the utterance support apparatus 200 shifts the block groups 412ar, 412br, and 412cr toward the lowest positions at which the blocks 412a to 412c were displayed. After that, the utterance support apparatus 200 updates the score to "1." The score is updated in proportion to the number of times of deletion of the block row 900. In FIG. 9, the block row 900 is deleted once, and one is thus added to the score, to thereby update the score from "0" in the state (A) to "1."

Figure 10:
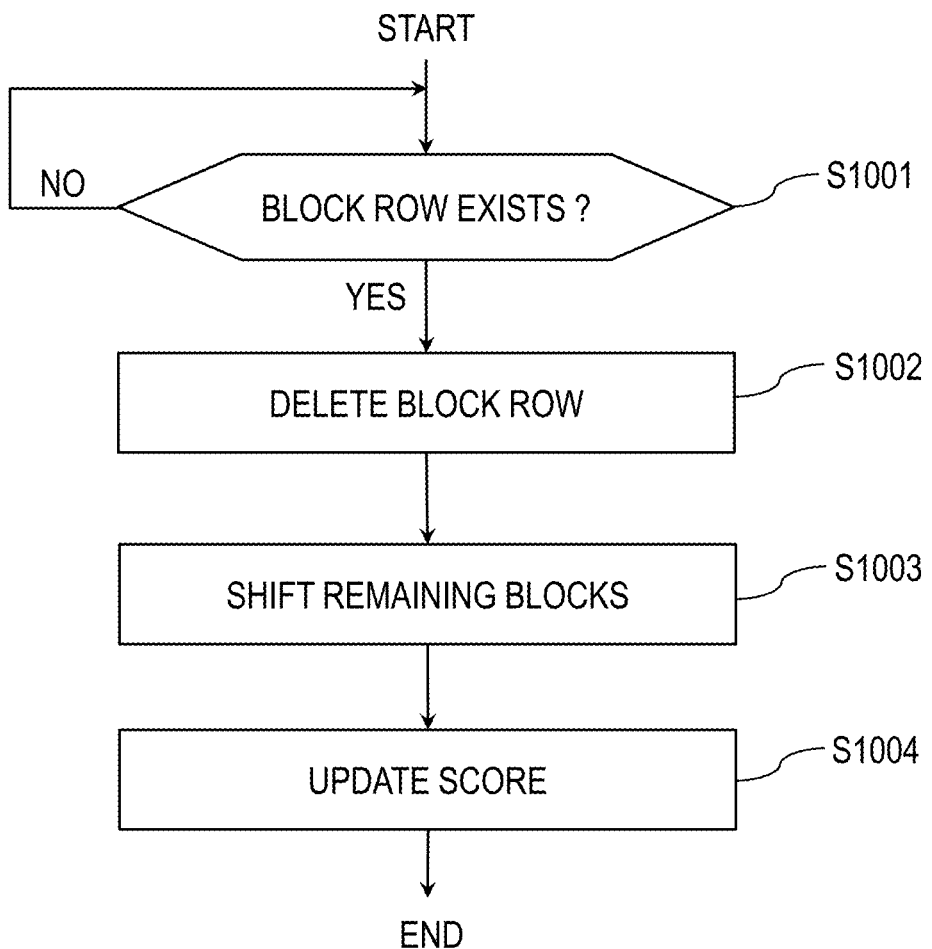
FIG. 10 is a flowchart for illustrating an example of a procedure of block row deletion processing.

FIG. 10 is a flowchart for illustrating an example of a procedure of block row deletion processing. The utterance support apparatus 200 determines whether or not the block row exists at the lowest position of the first display region 401 (Step S1001). When the block row does not exist (No in Step S1001), the utterance support apparatus 200 repeats Step S1001. When the block row exists (Yes in Step S1001), the utterance support apparatus 200 deletes the block row 900 (Step S1002), and shifts the remaining blocks downward in the first display region 401 (Step S1003). After that, the utterance support apparatus 200 updates the score 430 (Step S1004). As a result, the block row deletion processing is finished.

Example of Utterance Suppression Display

Figure 11:
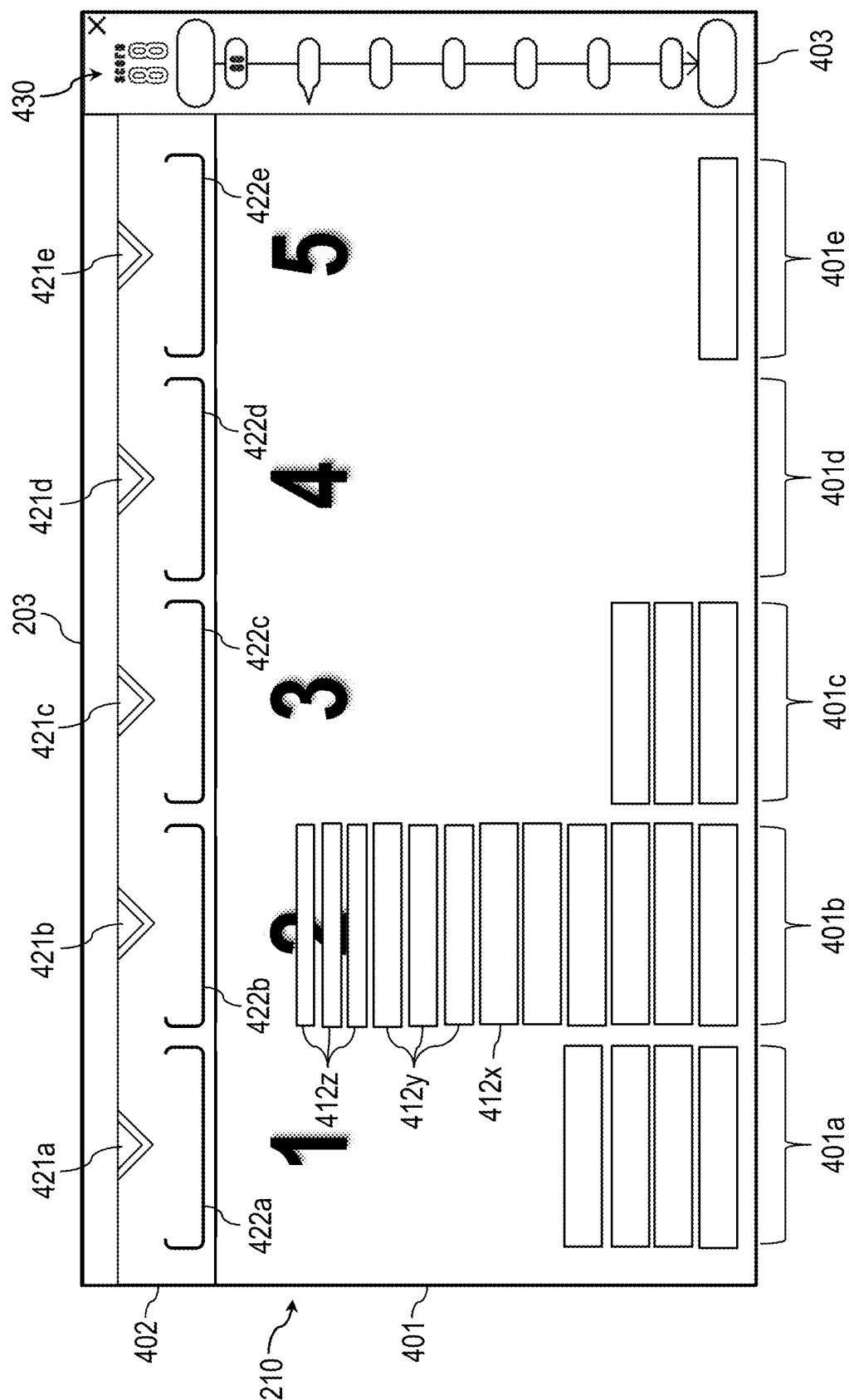
FIG. 11 is an explanatory diagram for illustrating a display example of the utterance support information for the utterance suppression.

FIG. 11 is an explanatory diagram for illustrating a display example of the utterance support information for the utterance suppression. When the utterance is unevenly made by a specific speaker (for example, the speaker B in this case), the blocks 412 are piled up, and consequently do not fit to the first display region 401b. Thus, as the blocks 412 are piled up, the utterance support apparatus 200 reduces a thickness of blocks displayed later compared with the thickness of blocks 412 displayed earlier. The thickness of the block 412 is a width in a direction in which the blocks 412 are piled up. A normal block 412 is denoted by "block 412x" in order to distinguish from thinner blocks 412y and 412z.

Specifically, for example, after a predetermined number n (for example, n=6) of the blocks 412x are piled up, the utterance support apparatus 200 displays the blocks 412y each thinner than the block 412x. Moreover, after a predetermined number m (for example, m=3) of the blocks 412y are piled up, the utterance support apparatus 200 displays the blocks 412z each thinner than the block 412y.

The first display region 401 can effectively be used by reducing the size of the blocks 412 as the number of blocks 412 increases for each of the speakers A to E. Moreover, the utterance support apparatus 200 achieves the increase in utterance amount through such gamification that the blocks 412 serving as rewards are offered, but as the number of blocks 412 increases, the size of the block 412 decreases. Therefore, the speaker feels that a reward corresponding to the utterance amount is not offered. Thus, the utterance support apparatus 200 can urge the speaker to suppress the utterance.

As described above, according to at least one embodiment, as the utterance support information 210, the utterance amount of each of the speakers A to E is visualized as the number of blocks, and it is thus possible to visually recognize the amount of utterance of each of the speakers A to E. Thus, it is possible to urge a speaker passive in utterance to utter positively, and to urge a speaker positive in utterance to suppress the utterance. Moreover, it is possible to recognize the productivity of the meeting through the display of the score 430 proportional to the number of times of deletion of the block row 900. As described above, it is possible to provide such support as bringing a state of the meeting held by the speakers A to E not high in productivity to a state high in productivity.

Moreover, as illustrated in FIG. 7, the increase in utterance amount can be achieved through the gamification of displaying the animation of storing the liquid corresponding to the amount of utterance when an utterance is made, to thereby generate the block 412, and offering the block 412 serving as the reward to the speakers A to E. In other words, the assignment of the block 412 to the uttered speaker can give such a sense of accomplishment that the speaker is contributing to the meeting. Moreover, as a speaker utters more, the speaker receives more blocks 412, and is thus urged to utter through fun and joy of getting the blocks 412 serving as the reward.

Moreover, the block row 900 is deleted when the blocks 412 are aligned at the lowest positions, and the satisfactory speaker balance among the speakers A to E can thus be achieved through the gamification of the deletion of the block row 900. In other words, all of the speakers A to E can experience such a sense of accomplishment that the speaker balance is increased through the deletion of the block row 900. Moreover, as the utterance amounts of all of the speakers A to E increase, the number of times of alignment of the blocks 412 at the lowest positions increases. The number of times of deletion of the block row 900 consequently increases, and the score 430 accordingly increases. As described above, the increase in productivity of the meeting, which corresponds to the satisfactory speaker balance among all of the speakers A to E and the increase in utterance amount, can be achieved through such gamification that the score 430 increases as the block row 900 is deleted.

Moreover, when the predetermined number of blocks 412 are displayed for any one of the speakers, the utterance support apparatus 200 may change a display color before the predetermined number is reached to a different color. Specifically, for example, the utterance support apparatus 200 may change a background color of the first display region 401 after the predetermined number is reached, or may change the display color of the blocks 412 of any one of the speakers after the predetermined number is reached. As a result, an imbalance among the speakers, that is, a decrease in speaker balance, can be notified to all of the speakers A to E.

Moreover, in at least one embodiment described above, description has been given of the example in which the utterance support information 210 is displayed on the display apparatus 202, but the utterance support apparatus 200 may transmit the utterance support information 210 to a terminal (for example, a personal computer or a smartphone) of each speaker communicable to/from the utterance support apparatus 200. As a result, each of the speakers A to E can check the number of own blocks, the numbers of blocks of other speakers, and the score 430 on the own terminal.

In particular, the utterance amount of a shy speaker is likely to be small, and the speaker more hesitates to utter when other speakers notice the small number of blocks 412 of this shy speaker on the display apparatus 202. Therefore, the hesitation to utter can be suppressed through the display of the utterance support information 210 on the terminal of each of the speakers A to E.

As described above, according to at least one embodiment, it is possible to provide such support as bringing a state of the meeting held by the speakers A to E not high in productivity to a state high in productivity.

It should be noted that this disclosure is not limited to the above-mentioned embodiments, and encompasses various modification examples and the equivalent configurations within the scope of the appended claims without departing from the gist of this disclosure. For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. An utterance support apparatus, comprising:
   a processor configured to execute a program; and
   a storage device configured to store the program,
   wherein the processor is configured to execute:
      calculation processing of calculating an accumulated value of utterance periods of each of a plurality of speakers, and clearing the accumulated value of a speaker having the accumulated value that has reached a predetermined value; and
      display processing of displaying respective first graphics a in respective first display regions assigned for each of the plurality of speakers, the display regions are a group of display regions, the first graphics respectively assigned to the speakers having the accumulated value that has reached the predetermined value, and
   wherein, in the display processing, when a group of first graphics including a first graphic for each of the plurality of speakers is arranged in an arrangement direction of the group of display regions, the processor deletes the group of first graphics.

2. The utterance support apparatus according to claim 1, wherein, in the display processing, each time the accumulated value reaches the predetermined value, the processor changes a size of following first graphics of, a speaker of the plurality of speakers, with respect to preceding first graphics to reduce the size of the most recent first graphics in the respective display region.

3. The utterance support apparatus according to claim 2, wherein, in the display processing, when a predetermined number of the preceding first graphics are displayed, the processor displays the following first graphics.

4. The utterance support apparatus according to claim 1, wherein, in the display processing, when a predetermined number of first graphics are displayed for any one of the plurality of speakers, the processor changes a color of the first graphics so that the color is different from a color of the first graphics before the predetermined number is reached.

5. The utterance support apparatus according to claim 1, wherein, in the display processing, the processor displays, in the display region, a second graphic corresponding to the accumulated value of the utterance periods until the predetermined value is reached.

6. The utterance support apparatus according to claim 5, wherein, in the display processing, the processor deletes the second graphic corresponding to the accumulated value when the accumulated value reaches the predetermined value.

7. The utterance support apparatus according to claim 6, wherein, in the display processing, the processor displays the first graphic when the second graphic is deleted.

8. The utterance support apparatus according to claim 1, wherein, in the calculation processing, the processor calculates a score based on the number of times of deletion of the group of first graphics, and wherein, in the display processing, the processor displays the score calculated through the calculation processing.

9. The utterance support apparatus according to claim 1, wherein, in the display processing, the processor displays, in each display region, a plurality of first graphics, which are each displayed each time the accumulated value reaches the predetermined value, so that the plurality of first graphics are arranged in a direction different from the arrangement direction.

10. The utterance support apparatus according to claim 9, wherein, in the display processing, the processor moves, in each display region, remaining first graphics toward a position at which the deleted first graphic was displayed.

11. An utterance support method, which is executed by an utterance support apparatus, the utterance support apparatus comprising a processor configured to execute a program; and a storage device configured to store the program, the utterance support method comprising executing, by the processor:
calculation processing of calculating an accumulated value of utterance periods of each of a plurality of speakers, and clearing the accumulated value of a speaker having the accumulated value that has reached a predetermined value; and
display processing of displaying respective first graphics in respective first display regions assigned for each of the plurality of speakers, the display regions are a group of display regions, the first graphics respectively assigned to the speakers having the accumulated value that has reached the predetermined value, and
wherein, in the display processing, when a group of first graphics including a first graphic for each of the plurality of speakers is arranged in an arrangement direction of the group of display regions, the processor deletes the group of first graphics.

12. A non-transitory computer-readable recording medium having recorded thereon an utterance support program for causing a processor to execute utterance support processing, the utterance support program causing the processor to execute:
calculation processing of calculating an accumulated value of utterance periods of each of a plurality of speakers, and clearing the accumulated value of a speaker having the accumulated value that has reached a predetermined value; and
display processing of displaying respective first graphics in respective first display regions display regions assigned for each of the plurality of speakers, the display regions are a group of display regions, the first graphics respectively assigned to the speakers having the accumulated value that has reached the predetermined value, and
wherein, in the display processing, when a group of first graphics including a first graphic for each of the plurality of speakers is arranged in an arrangement direction of the group of display regions, the processor deletes the group of first graphics.

13. An utterance support apparatus, comprising:
a processor configured to execute a program; and
a storage device configured to store the program,
wherein the processor is configured to execute:
calculation processing of calculating an accumulated value of utterance periods of each of a plurality of speakers, and clearing the accumulated value of a speaker having the accumulated value that has reached a predetermined value; and
display processing of displaying respective first graphics in respective first display regions assigned for each of the plurality of speakers, the display regions are a group of display regions, the first graphics respectively assigned to the speakers having the accumulated value that has reached the predetermined value,
wherein, in the display processing, the processor displays, in each display region, a plurality of first graphics, which are each displayed each time the accumulated value reaches the predetermined value, so that the plurality of first graphics are arranged in a direction different from the arrangement direction, and
wherein, in the display processing, upon deletion of a first graphic in each display region, the processor moves, in each display region, remaining first graphics toward a position at which the deleted first graphic was displayed, respectively.

* * * * *